United States Patent
Park et al.

(10) Patent No.: US 9,599,869 B2
(45) Date of Patent: Mar. 21, 2017

(54) DISPLAY APPARATUS

(71) Applicant: Samsung Display Co., Ltd., Yongin, Gyeonggi-Do (KR)

(72) Inventors: Joonyong Park, Gunpo-si (KR); Sanggab Kim, Seoul (KR); Changoh Jeong, Suwon-si (KR); Taeho Kang, Incheon (KR); Kyungseop Kim, Hwaseong-si (KR); Gwan Ha Kim, Hwaseong-si (KR); Byeong-Beom Kim, Asan-si (KR); Honglong Ning, Suwon-si (KR); Sangwon Shin, Yongin-si (KR); Sukyoung Yang, Yongin-si (KR); Yunjong Yeo, Seoul (KR); Dongmin Lee, Anyang-si (KR); Shin Il Choi, Hwaseong-si (KR); Hyunju Kang, Pocheon-si (KR); Sangwoo Sohn, Yongin-si (KR); Jungha Son, Seoul (KR); Yu-Gwang Jeong, Anyang-si (KR); Gugrae Jo, Asan-si (KR); Jinho Hwang, Osan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 204 days.

(21) Appl. No.: 14/099,971

(22) Filed: Dec. 8, 2013

(65) Prior Publication Data

US 2014/0204315 A1 Jul. 24, 2014

(30) Foreign Application Priority Data

Jan. 23, 2013 (KR) .................. 10-2013-0007571
Jul. 8, 2013 (KR) .................. 10-2013-0079851

(51) Int. Cl.
*G02F 1/1335* (2006.01)
*G02F 1/1362* (2006.01)

(52) U.S. Cl.
CPC .......... *G02F 1/136286* (2013.01); *G02F 2001/13629* (2013.01); *G02F 2001/133548* (2013.01); *G02F 2201/38* (2013.01)

(58) Field of Classification Search
CPC ............ G02F 1/1335; G02F 1/136286; G02F 2001/133548; G02F 2001/13629; G02F 2201/38

(Continued)

(56) References Cited

U.S. PATENT DOCUMENTS 5,724,107 A 3/1998 Nishikawa et al.
6,630,972 B1 10/2003 Shiraishi (Continued)

FOREIGN PATENT DOCUMENTS

JP 11-101974 A 4/1999
JP 2007-017762 A 1/2007

(Continued)

*Primary Examiner* — Charles Chang
(74) *Attorney, Agent, or Firm* — Cantor Colburn LLP

(57) ABSTRACT

A display apparatus includes a backlight assembly which generates a light and a display panel which receives the light to display an image, the display panel including a first substrate, a second substrate which faces the first substrate and is disposed closer to the backlight assembly than the first substrate, a gate line disposed on the first substrate, a data line disposed on the gate line and insulated from the gate line, a thin film transistor disposed on the first substrate and electrically connected to the gate line and the data line, and a reflection preventing layer disposed between the first substrate and the gate line to reduce an amount of a reflected light reflected by the gate line.

16 Claims, 15 Drawing Sheets

(58) Field of Classification Search
USPC .......................................................... 349/46
See application file for complete search history.

(56) References Cited

U.S. PATENT DOCUMENTS

| | | |
|---|---|---|
| 7,259,806 B1 * | 8/2007 | Lee .................. G02F 1/136209 |
| | | 257/59 |
| 7,330,226 B2 | 2/2008 | Kim |
| 7,639,414 B2 | 12/2009 | Hwang et al. |
| 7,772,768 B2 | 8/2010 | Oh et al. |
| 7,876,402 B2 | 1/2011 | Kim |
| 8,154,690 B2 | 4/2012 | Nagata et al. |
| 2004/0183763 A1 * | 9/2004 | Matsui .............. G02F 1/136286 |
| | | 345/87 |
| 2007/0076143 A1 | 4/2007 | Palk et al. |
| 2007/0242352 A1 | 10/2007 | MacMaster |
| 2009/0267087 A1 * | 10/2009 | Yang ................ G02F 1/136286 |
| | | 257/88 |
| 2010/0253605 A1 | 10/2010 | Inada |
| 2011/0018815 A1 | 1/2011 | Han et al. |
| 2011/0037928 A1 | 2/2011 | Little |
| 2011/0128475 A1 | 6/2011 | Park et al. |
| 2011/0268875 A1 | 11/2011 | Yoshihara et al. |

FOREIGN PATENT DOCUMENTS

| | | |
|---|---|---|
| JP | 2008-216315 A | 9/2008 |
| JP | 2010-277077 A | 12/2010 |
| KR | 100182040 B1 | 12/1998 |
| KR | 1020000014536 A | 3/2000 |
| KR | 1020020041655 A | 6/2002 |
| KR | 1020090053612 A | 6/2009 |
| KR | 1020120040413 A | 4/2012 |

* cited by examiner

DISPLAY APPARATUS

This application claims priority to Korean Patent Application No. 10-2013-0007571, filed on Jan. 23, 2013 and Korean Patent Application No. 10-2013-0079851, filed on Jul. 8, 2013, and all the benefits accruing therefrom under 35 U.S.C. §119, the contents of which are hereby incorporated by reference.

BACKGROUND

1. Field

The invention relates to a display apparatus. More particularly, the invention relates to a display apparatus having an improved display quality.

2. Description of the Related Art

A display apparatus including a display panel that is not self-emissive such as a liquid crystal display panel, for example, includes a backlight assembly, and the display panel displays an image using light provided from the backlight assembly.

The display panel typically includes a display substrate on which pixels are disposed, an opposite substrate facing the display substrate, a liquid crystal layer interposed between the display substrate and the opposite substrate and polarizing plates respectively disposed on a front surface and a rear surface of the display panel. The display substrate includes signal lines electrically connected to the pixels to transmit various signals to the pixels and thin film transistors electrically connected to the pixels and the signal lines.

SUMMARY

The invention provides a display apparatus having an improved display quality.

Exemplary embodiments according to the invention provide a display apparatus including a backlight assembly generating a light and a display panel receiving the light to display an image.

The display panel includes a first substrate, a second substrate, a gate line, a data line, a thin film transistor ("TFT") and a reflection preventing layer. The first substrate faces the second substrate, and the second substrate is disposed closer to the backlight assembly than the first substrate. The gate line is disposed on the first substrate, the data line is insulated from the gate line and disposed on the gate line, and the thin film transistor is disposed on the first substrate to be electrically connected to the gate line and the data line. The reflection preventing layer is disposed between the first substrate and the gate line to effectively reduce an amount of a reflected light reflected by the gate line.

Exemplary embodiments according to the invention provide a display apparatus including a backlight assembly generating a light and a display panel receiving the light to display an image.

The display panel includes a first substrate, a second substrate, a liquid crystal layer, grid polarizing layers and a reflection preventing layer. The first substrate includes a pixel area and the second substrate faces the first substrate. The liquid crystal layer is interposed between the first substrate and the second substrate. The grid polarizing layers are disposed on the second substrate to correspond to the pixel area, extended in one direction to be spaced apart from each other, and transmit or reflect the light passing through the display panel according to a vibration direction of the light. The reflection preventing layer is disposed on the grid polarizing layers to effectively reduce an amount of a reflected light reflected by the grid polarizing layers.

According to the above, the reflection preventing layer may effectively prevent an external light from being reflected by the display panel, and thus deterioration in the display quality of the image occurring when the light used to display the image in the display panel is mixed with the reflected light is effectively prevented.

In addition, since the reflection preventing layer effectively reduces the amount of the reflected light reflected by the reflection preventing layer by using a destructive interference occurring between the reflected light reflected by the reflection preventing layer and the light reflected by the elements of the display panel, an amount of the reflected light having a desired wavelength may be effectively reduced by controlling a refractive index and a thickness of the reflection preventing layer.

BRIEF DESCRIPTION OF THE DRAWINGS

The above and other aspects, advantages of this disclosure will become readily apparent by reference to the following detailed description when considered in conjunction with the accompanying drawings wherein.

DETAILED DESCRIPTION

Figure 1:
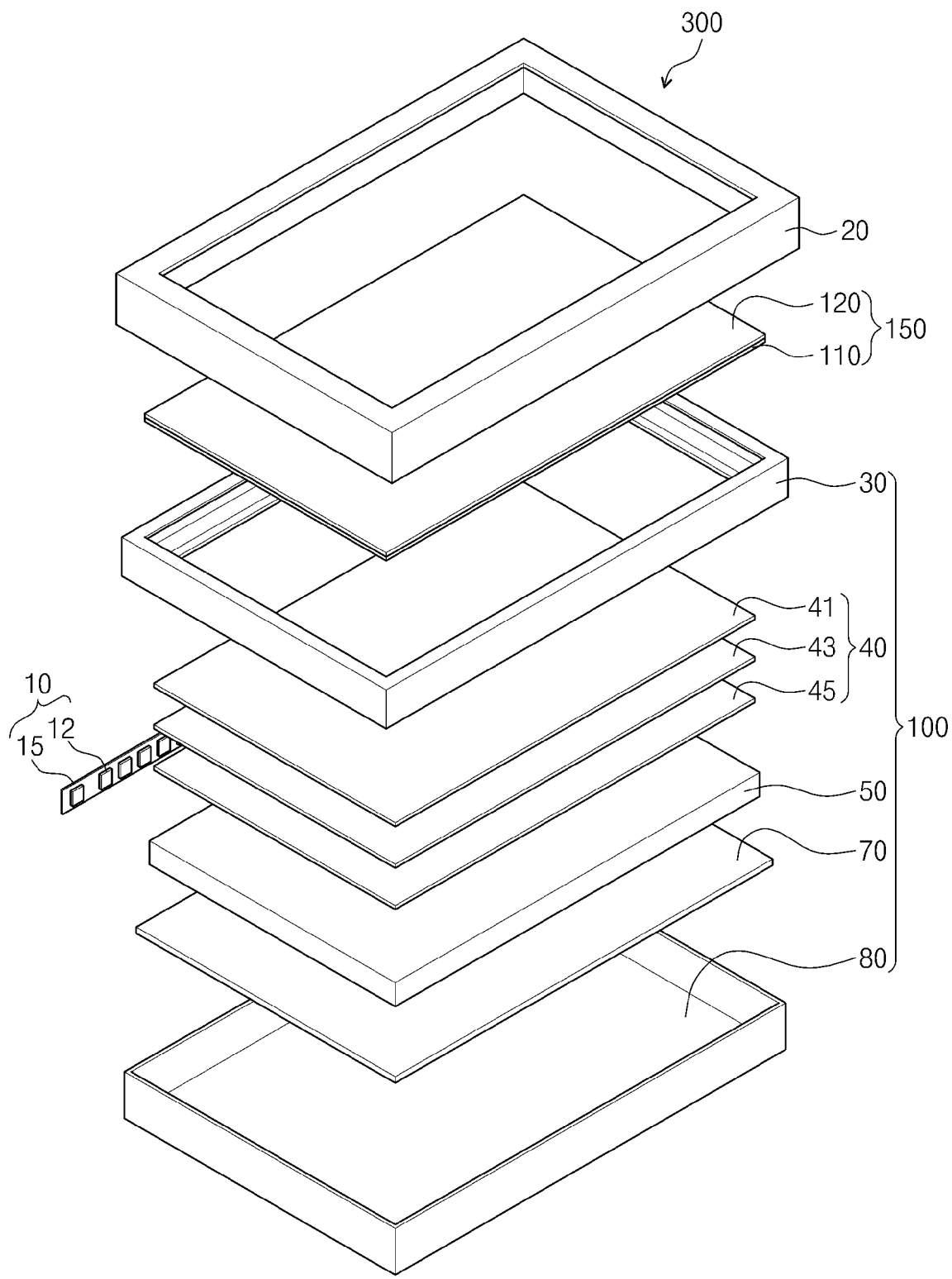
FIG. 1 is an exploded perspective view showing an exemplary embodiment of a display apparatus according to the invention.

When a display substrate is disposed to be exposed to external light, the external light is reflected by signal lines and electrodes of thin film transistors ("TFTs") of the display substrate, and thus the reflected light is perceived by a user. In addition, when at least one of polarizing plates is realized by a wire grid polarizer including metal wires, an external light is reflected by the wire grid polarizer and the reflected light is perceived by the user. The reflected light, which is perceived by the user through the above-described light path, corresponds to a noise in the image displayed on the display panel.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

The terminology used herein is for the purpose of describing particular exemplary embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 2:
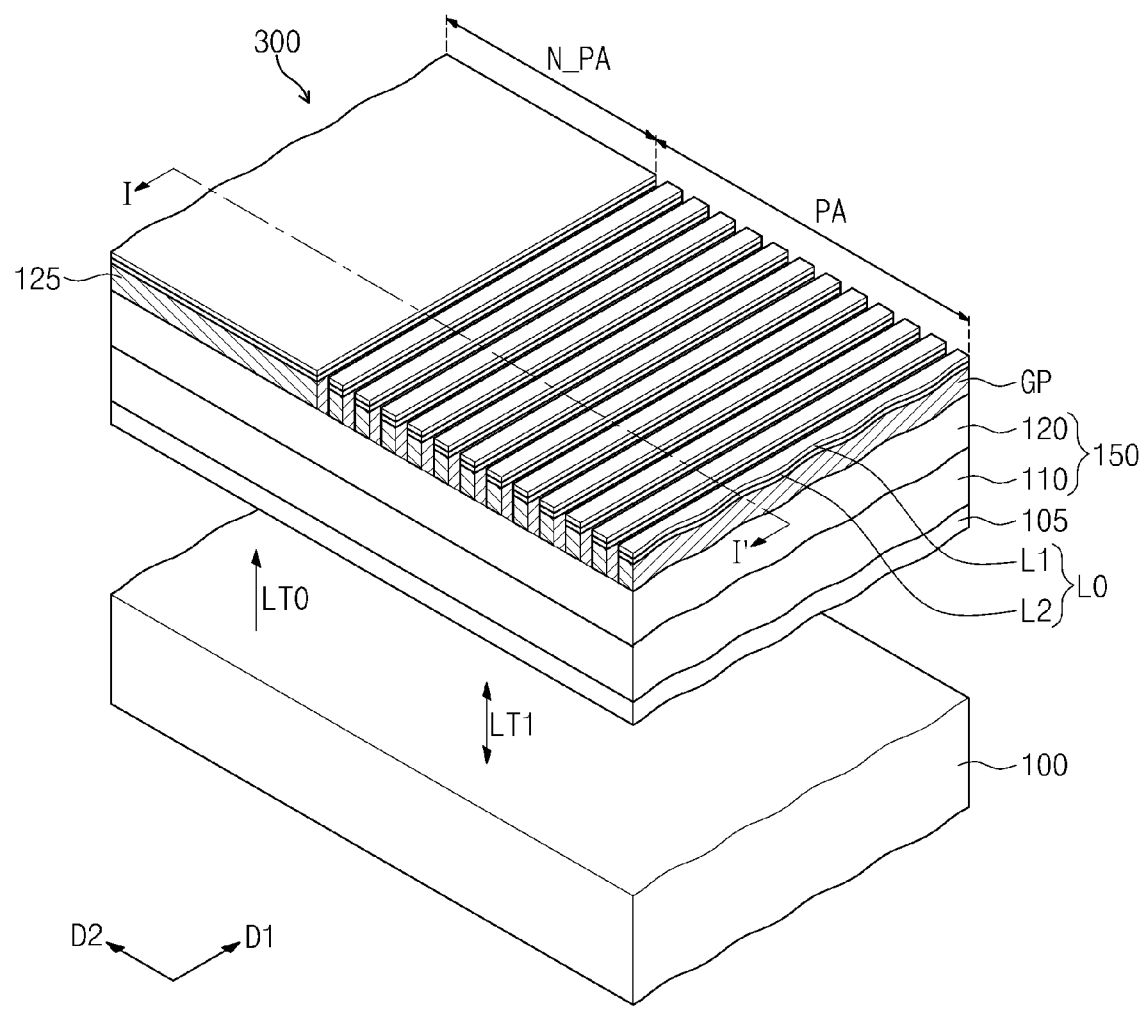
FIG. 2 is an enlarged perspective view showing a portion of a display panel of FIG. 1.

FIG. 1 is an exploded perspective view showing a display apparatus according to an exemplary embodiment of the invention, and FIG. 2 is an enlarged perspective view showing a portion of a display panel of FIG. 1.

Referring to FIGS. 1 and 2, a display apparatus 300 includes a backlight assembly 100 and a display panel 150.

The display panel 150 includes a display substrate 110, an opposite substrate 120, a liquid crystal layer LC (refer to FIG. 3A), a polarizing substrate 105, grid polarizing layers GP, a reflection layer 125 and a reflection preventing layer L0. The opposite substrate 120 faces the display substrate 110, and the liquid crystal layer is interposed between the display substrate 110 and the opposite substrate 120. The polarizing substrate 105 is disposed under the display substrate 110, and the grid polarizing layers GP, the reflection layer 125 and the reflection preventing layer L0 are disposed on the opposite substrate 120. Detailed descriptions of the grid polarizing layers GP, the reflection layer 125 and the reflection preventing layer L0 will be described later.

The backlight assembly 100 emits an emitted light LT0 to the display panel 150, and the display panel 150 receives the emitted light LT0 to display an image thereon. However, the structure of the backlight assembly 100 should not be limited thereto or thereby, and detailed descriptions on the backlight assembly 100 according to the illustrated exemplary embodiment are provided as follows.

The backlight assembly 100 includes a receiving container 80, a light emitting unit 10, a reflection member 70, a light guide plate 50, a mold frame 30, a plurality of sheets 40 and a cover member 20.

The receiving container 80 includes a bottom portion and a plurality of sidewalls extended from the bottom portion to provide a containing space. The light emitting unit 10 is disposed (e.g., accommodated) in the containing space and generates a light used as a source of the emitted light LT0. In the illustrated exemplary embodiment, the light emitting unit 10 includes a printed circuit board 15 and a plurality of light emitting diode packages 12 disposed (e.g., mounted) on the printed circuit board 15. In addition, the light emitting unit 10 is disposed to face a surface on one side of the light guide plate 50. In this case, the light generated from the light emitting diode packages 12 is incident to the light guide plate 50 through the surface on one side of the light guide plate 50.

The light guide plate 50 is disposed (e.g., accommodated) in the containing space of the receiving container 80. The light guide plate 50 receives the light generated from the light emitting unit 10 to guide the light to the display panel 150 using light guide patterns which have a concavo-convex shape (not shown) and are disposed on a rear surface of the light guide plate 50. The reflection member 70 includes a light reflection material, such as aluminum, and is disposed between the bottom portion of the receiving container 80 and the light guide plate 50. Thus, the light, which reaches onto the reflection member 70 in the receiving container 80, especially the light that reaches onto the reflection member 70 after being reflected by the grid polarizing layers GP, is reflected by the reflection member 70 and provided to the light guide plate 50. Therefore, a light utilization efficiency of the backlight assembly 100 is improved.

The sheets 40 are disposed between the light guide plate 50 and the display panel 150. In the illustrated exemplary embodiment, the sheets 40 include a protection sheet 41, a prism sheet 43 and a diffusion sheet 45, and the protection sheet 41 has a non-optical property and protects a rear surface of the display panel 150. The prism sheet 43 enhances a front brightness of the display panel 150, and the diffusion sheet 45 diffuses the light guided to the display panel 150 by the light guide plate 50.

The mold frame 30 is coupled to the receiving container 80 and supports edges of the light guide plate 50 and the sheets 40. In addition, the cover member 20 is partially opened to expose a display area of the display panel 150 and covers edges of the display panel 150 while being coupled to the receiving container 80.

Hereinafter, the display panel 150 will be described in detail with reference to FIGS. 2, 3A and 3B.

Figure 3A:
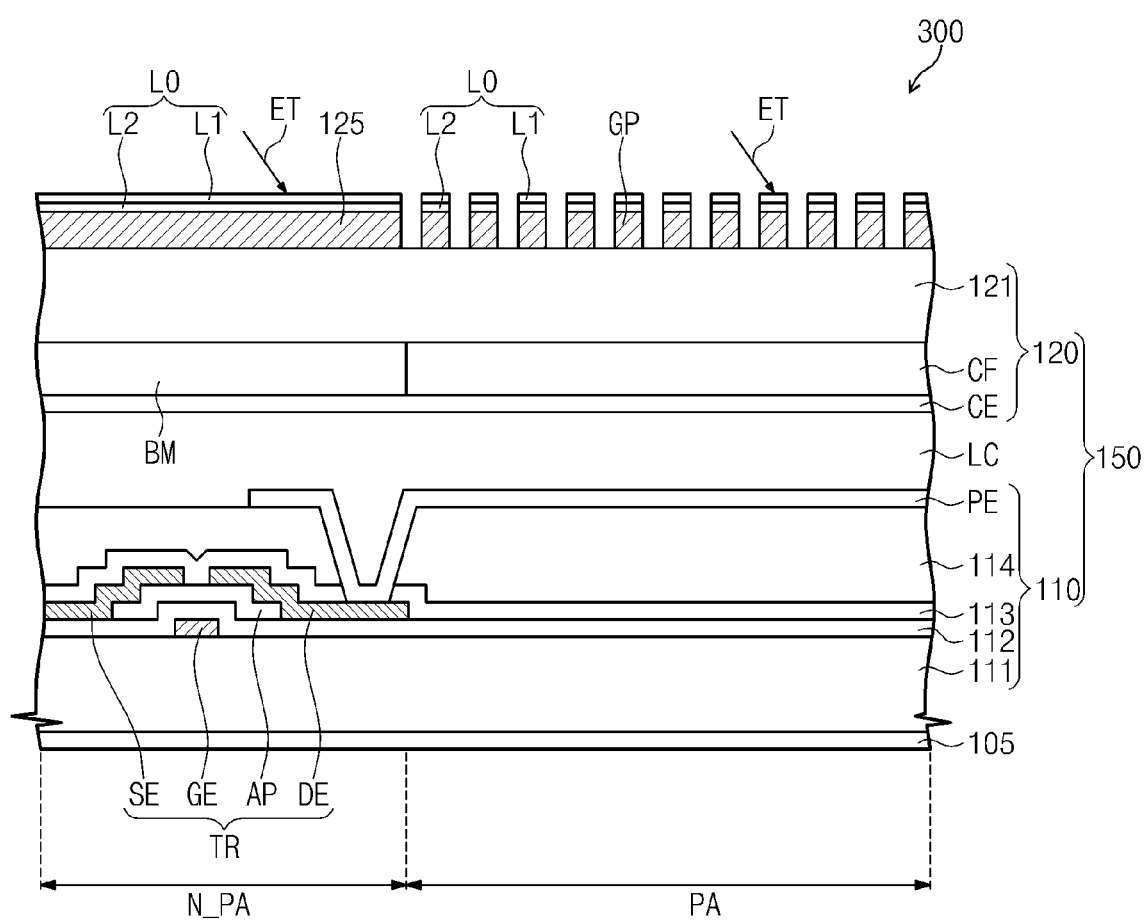
FIG. 3A is a cross-sectional view taken along line I-I' of FIG. 2.
Figure 3B:
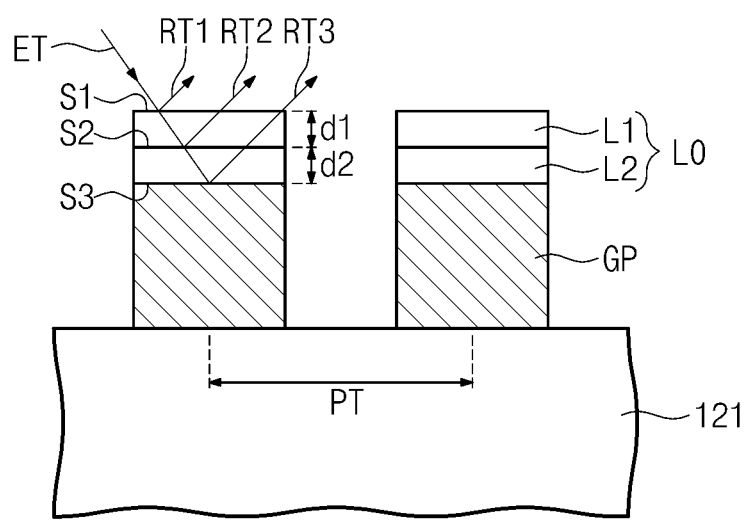
FIG. 3B is an enlarged cross-sectional view showing a reflection preventing layer and grid polarizing layers of FIG. 3A.

FIG. 3A is a cross-sectional view taken along line I-I' of FIG. 2, and FIG. 3B is an enlarged cross-sectional view showing the reflection preventing layer L0 and the grid polarizing layers GP of FIG. 3A.

Referring to FIGS. 2, 3A and 3B, the display substrate 110 includes a first substrate 111, a thin film transistor TR and a pixel electrode PE. The first substrate 111 includes a pixel area PA and a non-pixel area N_PA. In the illustrated exemplary embodiment, the first substrate 111 may include a glass substrate or a plastic substrate, and when the first substrate 111 includes the plastic substrate, the first substrate 111 may have a flexible property.

The thin film transistor TR is disposed in the non-pixel area N_PA. The thin film transistor TR includes a gate electrode GE, an active pattern AP, a source electrode SE and a drain electrode DE. The gate electrode GE is electrically connected to a gate line GL (not shown) and disposed on the first substrate 111, and the active pattern AP is disposed on the gate electrode GE while interposing a gate insulating layer 112 therebetween.

In the illustrated exemplary embodiment, the active pattern AP includes a semiconductor material such as amorphous silicon, however, it should not be limited thereto or thereby. According to another exemplary embodiment, the active pattern AP may include oxide semiconductor, such as indium gallium zinc oxide ("IGZO"), zinc oxide ("ZnO"), $SnO_2$, indium oxide ($In_2O_3$), $Zn_2SnO_4$, $Ge_2O_3$, $HfO_2$ or compound semiconductor, such as gallium arsenide (GaAs), gallium phosphide (GaP) and indium phosphide (InP), for example.

The source electrode SE is electrically connected to a data line DL (not shown) and disposed on the active pattern AP. The pixel electrode PE is disposed in the pixel area PA, and the pixel electrode PE is disposed on an inorganic insulating layer 113 and an organic insulating layer 114, which cover the thin film transistor TR. In addition, the pixel electrode PE is electrically connected to the drain electrode DE through a contact hole defined through the inorganic insulating layer 113 and the organic insulating layer 114. Thus, when the gate signal is applied to the gate electrode GE through the gate line to turn on the thin film transistor TR, the data signal, which is applied to the source electrode SE through the data line, is applied to the pixel electrode PE through the active pattern AP and the drain electrode DE.

In the illustrated exemplary embodiment, the opposite substrate 120 includes a second substrate 121, a common electrode CE, a light blocking layer BM and a color filter CF. The second substrate 121 may be a transparent substrate, such as a glass substrate, a plastic substrate, etc., the common electrode CE is disposed on the second substrate 121, and the common electrode CE faces the pixel electrode PE while interposing the liquid crystal layer LC therebetween to generate an electric field in cooperation with the pixel electrode PE, thereby controlling a director of liquid crystal molecules of the liquid crystal layer LC.

The light blocking layer BM is disposed on the second substrate 121 corresponding to the non-display area N_PA, and the color filter CF is disposed on the second substrate 121 corresponding to the pixel area PA. Thus, among the emitted light LT0 emitted from the backlight assembly 100, the light that travels to the non-pixel area N_PA is blocked by the light blocking layer BM and the light that travels to the pixel area PA is filtered by the color filter CF to have a desired color.

However, the display substrate 110 and the opposite substrate 120 should not be limited to the above-mentioned structure. In an exemplary embodiment, the color filter CF may be overlapped with the pixel electrode PE and disposed on the first substrate 111, and the common electrode CE may be spaced apart from the pixel electrode PE and disposed on the first substrate 111, for example.

The polarizing substrate 105 is disposed on a lower surface of the display substrate 110 to be interposed between the display panel 150 and the backlight assembly 100, and the grid polarizing layers GP, the reflection preventing layer L0 and the reflection layer 125 are disposed on an upper surface of the opposite substrate 120.

The reflection layer 125 is disposed on the second substrate 121 to correspond to the non-display area N_PA and reflects the light reached thereto after passing through the display panel 150 among the emitted light LT0. The light reflected by the reflection layer 125 may be reflected again by the reflection member 70 shown in FIG. 1.

The grid polarizing layers GP are disposed on the second substrate 121 to correspond to the pixel area PA. In the illustrated exemplary embodiment, the grid polarizing layers GP are extended in a first direction D1 and arranged in a second direction D2 substantially perpendicular to the first direction D1 to be spaced apart from each other with a pitch PT (refer to FIG. 3B).

When the pitch PT is smaller than a wavelength of the light incident to the grid polarizing layers GP, the grid polarizing layers GP may serve as a wire grid polarizer that polarizes or reflects the light incident thereto according to a vibration direction of the light. In an exemplary embodiment, when the light that vibrates in a direction perpendicular to the first direction D1 is referred to as a P-polarized light and the light that vibrates parallel to the first direction D1 is referred to as a S-polarized light among the light incident thereto, the P-polarized light transmits through the grid polarizing layers GP, and the S-polarized light is reflected by the grid polarizing layers GP, for example.

In addition, the S-polarized light reflected by the grid polarizing layers GP is again reflected by the reflection member 70 (refer to FIG. 1), and thus a reflected light LT1 having a P-polarized light and a S-polarized light may be generated. The P-polarized light of the reflected light LT1 passes through the grid polarizing layers GP, and the S-polarized light of the reflected light LT1 is again reflected by the grid polarizing layers GP. Thus, a utilization efficiency of the emitted light LT0 used to display the image on the display panel 150 may be improved.

The reflection preventing layer L0 is disposed on the reflection layer 125 and the grid polarizing layers GP, and effectively reduces the amount of the light reflected by the reflection layer 125 and the grid polarizing layers GP. In the exemplary embodiment shown in FIGS. 3A and 3B, the reflection preventing layer L0 includes a first sub-layer L1 and a second sub-layer L2.

The first sub-layer L1 has a first refractive index and a second sub-layer L2 has a second refractive index that is greater than the first refractive index. The second sub-layer L2 is disposed on the reflection layer 125 and the grid polarizing layers GP, and the first sub-layer L1 is disposed on the second sub-layer L2.

In the illustrated exemplary embodiment, the first sub-layer L1 contacts with the second-sub layer L2, and the second sub-layer L2 contacts with the grid polarizing layers GP and the reflection layer 125. In addition, referring to FIG. 3B, the first sub-layer L1 has a first thickness d1 of about 50 angstroms (Å) to about 800 Å, and the second sub-layer L2 has a second thickness d2 of about 50 Å to about 800 Å.

Hereinafter, a method of effectively reducing the amount of the reflected light reflected by grid polarizing layers GP using the reflection preventing layer L0 will be described. Since the method is the same as a method of effectively reducing the amount of the reflected light reflected by reflection layer 125 using the reflection preventing layer L0, detailed descriptions on this will be omitted.

When an external light ET is provided to the display panel 150, a portion of the external light ET is reflected by a first surface S1 of the first sub-layer L1 to generate a first reflected light RT1. In addition, another portion of the external light ET passes through the first sub-layer L1 and is reflected by a second surface S2, which is an interface between the first sub-layer L1 and the second sub-layer L2, to generate a second reflected light RT2, and the other portion of the external light ET passes through the second sub-layer L2 and is reflected by a third surface S3, which is an interface between the second sub-layer L2 and the grid polarizing layers GP, to generate a third reflected light RT3.

The first, second and third reflected lights RT1, RT2, and RT3 may be mixed with the light used to display the image on the display panel 150, and thus a deterioration in a contrast ratio of the image is caused. However, in the illustrated exemplary embodiment, the amount of the first, second, and third reflected lights RT1, RT2, and RT3 may be effectively reduced using a destructive interference occurring between the first, second and third reflected lights RT1, RT2, and RT3. In the illustrated exemplary embodiment, when the thicknesses of the first sub-layer L1 and the second sub-layer L2 are set to satisfy the following Equation 1, the destructive interference occurs between at least two of the first, second and third reflected lights RT1, RT2 and RT3.

$$(d1+d2) \approx \{(\lambda/4) \times (1/n_1)\} + \{(\lambda/4) \times (1/n_2)\} \quad \text{Equation 1}$$

In Equation 1, d1 denotes a thickness of the first sub-layer L1, d2 denotes a thickness of the second sub-layer L2, $\lambda$ denotes a wavelength of the external light ET, $n_1$ denotes a refractive index of the first sub-layer L1, and $n_2$ denotes a refractive index of the second sub-layer L2.

In the illustrated exemplary embodiment, the first sub-layer L1 includes one of metal oxide, metal nitride, transparent conductive oxide and metal, and the second sub-layer L2 includes one of metal oxide, metal nitride and transparent conductive oxide.

In the following Table 1, various exemplary embodiments of the components and thicknesses of the first and second sub-layers L1 and L2 are shown to allow the reflection preventing layer L0 to have a reflectivity within a range from about 0.1 percent (%) to about 5% by taking the wavelength of the external light ET, the first thickness d1, the second thickness d2, the refractive index of the first sub-layer L1 and the refractive index of the second sub-layer L2 into consideration.

TABLE 1

| components of the reflection preventing layer (first sub-layer/second sub-layer) | thickness (Å) (first sub-layer/second sub-layer) | reflectivity (%) | |
|---|---|---|---|
| MoOx/TiNx | 450/150 | 4.89 | First sub-layer includes metal oxide. |
| TiOx/TiNx | 450/200 | 4.73 | |
| AlOx/CuOx | 300/300 | 4.95 | |
| CuOx/TiNx | 450/550 | 4.88 | |
| CuOx/MoNx | 450/200 | 4.89 | |
| SiOx/CuOx | 450/300 | 4.84 | |
| AlNx/TiNx | 450/150 | 4.84 | First sub-layer includes metal nitride. |
| CuNx/SiOx | 200/750 | 4.53 | |
| CuNx/AlOx | 200/600 | 4.95 | |
| CuNx/GZO (GZO = Ga₂O₃:ZnO = 11.8 wt %:88.2 wt %) | 200/550 | 4.83 | |
| CuNx/AZO | 200/550 | 4.89 | |
| CuNx/IZO | 200/550 | 4.95 | |
| CuNx/SiNx | 200/550 | 4.55 | |
| CuNx/GZO | 200/500 | 4.80 | |
| CuNx/IZO | 150/500 | 4.93 | |
| CuNx/MoOx | 150/400 | 4.49 | |
| CuNx/AlNx | 150/400 | 4.38 | |
| CuNx/TiOx | 150/400 | 4.77 | |
| SiNx/CuOx | 150/300 | 5.00 | |
| ITO/AlNx | 200/500 | 4.90 | First sub-layer includes a transparent conductive layer. |
| ITO/CuOx | 200/300 | 4.76 | |
| IZO/CuOx | 100/300 | 4.74 | |
| GZO/CuOx (GZO = Ga₂O₃:ZnO = 11.8 wt %:88.2 wt %) | 150/300 | 4.90 | |
| GZO/CuOx (GZO = Ga₂O₃:ZnO = 20.4 wt %:79.6 wt %) | 100/300 | 4.72 | |
| AZO/CuOx | 150/300 | 4.97 | |
| Ti/AlNx | 100/300 | 4.58 | First sub-layer includes metal. |
| Ti/GZO (GZO = Ga₂O₃:ZnO = 20.4 wt %:79.6 wt %) | 100/400 | 4.31 | |

TABLE 1-continued

| components of the reflection preventing layer (first sub-layer/ second sub-layer) | thickness (Å) (first sub- layer/second sub-layer) | reflec- tivity (%) |
|---|---|---|
| Ti/IZO | 100/450 | 4.40 |
| Ti/MoOx | 100/300 | 4.64 |
| Ti/TiOx | 100/300 | 4.49 |

In the Table 1 according to the illustrated exemplary embodiment, a weight percent of indium oxide ($In_2O_3$) of the indium zinc oxide ("IZO") is in a range of about 10 wt % to about 90 wt %, a weight percent of aluminum oxide ($Al_2O_3$) of the aluminum zinc oxide ("AZO") is in a range of about 0.1 wt % to about 10 wt %, and a weight percent of gallium oxide ($Ga_2O_3$) of the gallium zinc oxide ("GZO") is in a range of about 0.1 wt % to about 30 wt %.

When the reflection preventing layer L0 includes the first and second sub-layers L1 and L2 having the components and thicknesses shown in the Table 1, the reflectivity of the reflection preventing layer L0 may be within a range from about 0.1% to about 5%. That is, when the external light ET is provided to the grid polarizing layers GP, only from about 0.1% to about 5% of the light among the total external light ET is reflected by the grid polarizing layers GP and significant portions of the remaining external light ET become extinct by the reflection preventing layer L0.

In the illustrated exemplary embodiment, the reflection preventing layer L0 includes two sub-layers having different refractive indexes from each other as described above. However, the number of the sub-layers should not be limited thereto. In an exemplary embodiment, the reflection preventing layer L0 may include three or more sub-layers stacked one on another, and in this case, the refractive index of the sub-layers becomes greater according to a stack order from bottom of the sub-layers to the top of the sub-layers, for example.

Figure 4:
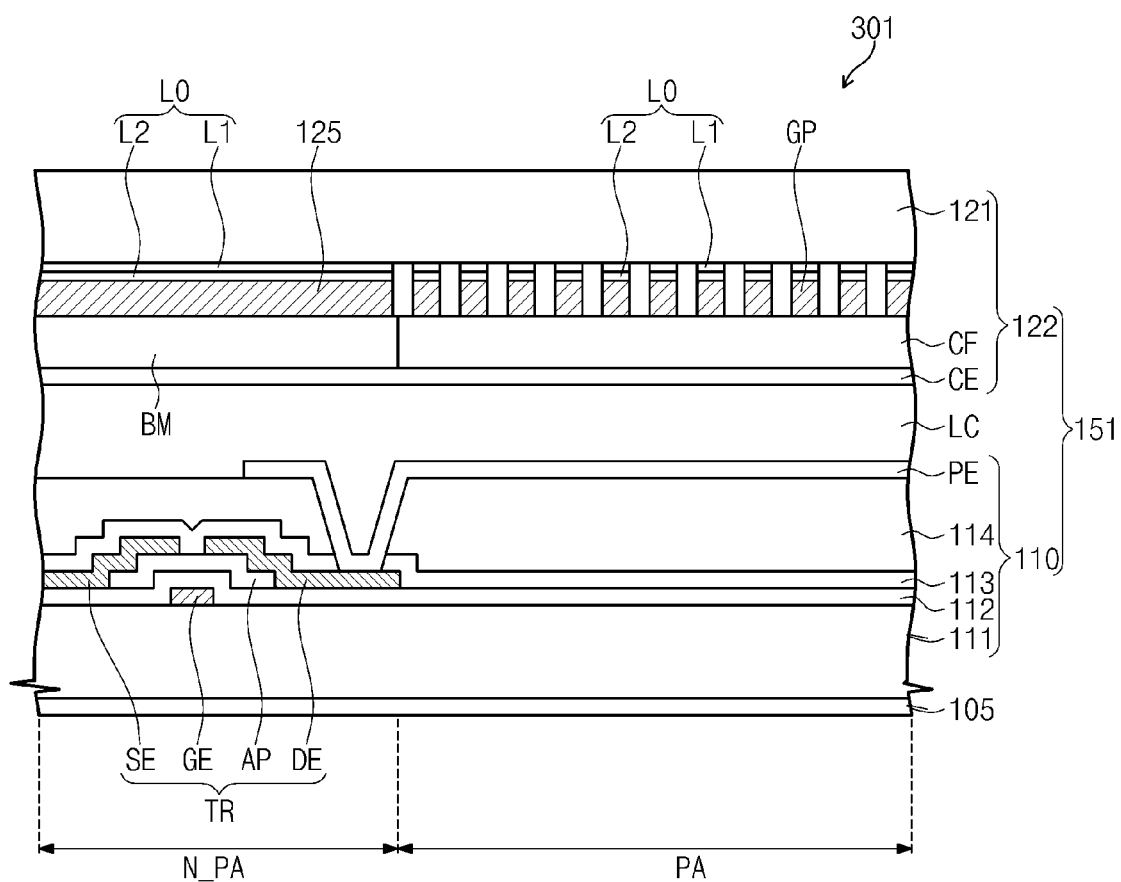
FIG. 4 is a cross-sectional view showing another exemplary embodiment of a display apparatus according to the invention.

FIG. 4 is a cross-sectional view showing a display apparatus according to another exemplary embodiment of the invention. In FIG. 4, the same reference numerals denote the same elements in FIGS. 1, 2, 3A and 3B, and thus the detailed descriptions of the same elements will be omitted in FIG. 4.

Referring to FIG. 4, a display apparatus 301 includes a display panel 151, and the display panel 151 includes a display substrate 110 and an opposite substrate 122. In the illustrated exemplary embodiment, different from the exemplary embodiment shown in FIGS. 3A and 3B, grid polarizing layers GP, a reflection layer 125 and a reflection preventing layer L0 are disposed inside of the display panel 151. In more detail, the grid polarizing layers GP and the reflection layer 125 are disposed on a second substrate 121, and the reflection preventing layer L0 is disposed between the grid polarizing layers GP and the second substrate 121 and between the reflection layer 125 and the second substrate 121.

Similar to the exemplary embodiment described above with reference to FIGS. 1 to 3B, the thicknesses of a first sub-layer L1 and a second sub-layer L2 of the reflection preventing layer L0 may be set based on the Equation 1, and various layers having the components and thicknesses shown in the Table 1 may be used as the first and second sub-layers L1 and L2. Thus, although an external light is reflected by the grid polarizing layers GP and the reflection layer 125 after passing through the second substrate 121 to generate a reflected light, the amount of the reflected light is effectively reduced by the reflection preventing layer L0.

Figure 5A:
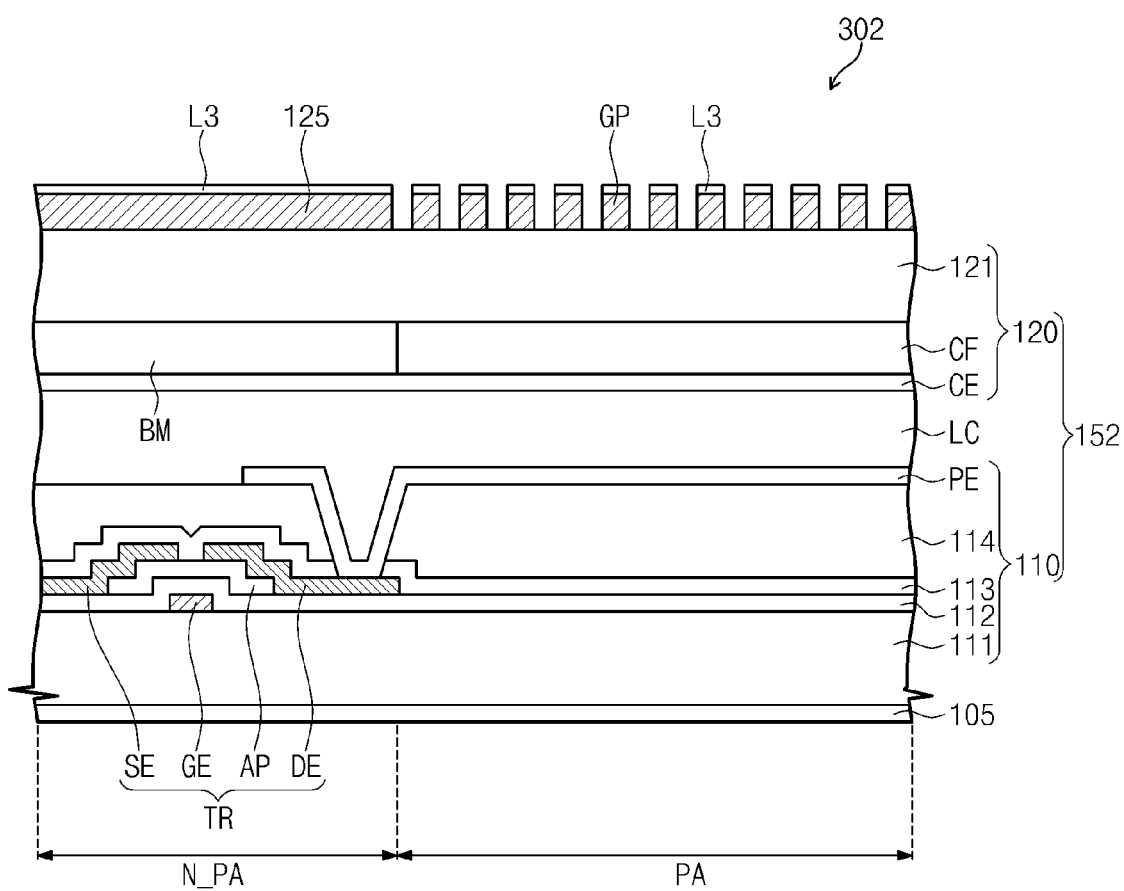
FIG. 5A is a cross-sectional view showing another exemplary embodiment of a display apparatus according to the invention.
Figure 5B:
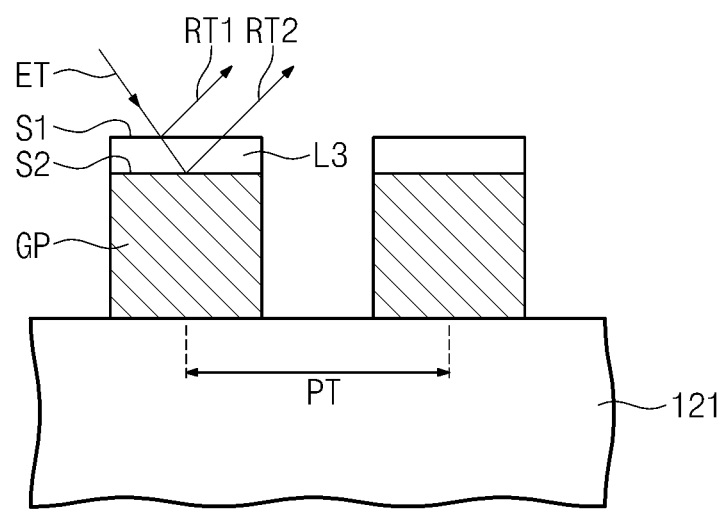
FIG. 5B is an enlarged cross-sectional view showing a reflection preventing layer and grid polarizing layers of FIG. 5A.

FIG. 5A is cross-sectional view showing a display apparatus according to another exemplary embodiment of the invention, and FIG. 5B is an enlarged cross-sectional view showing a reflection preventing layer and grid polarizing layers. A display apparatus 302 shown in FIGS. 5A and 5B has a similar structure and function as those of the display apparatus 300 shown in FIG. 3A except for a reflection preventing layer L3. Thus, the same reference numerals in FIGS. 5A and 5B denote the same elements in FIGS. 1 to 4, and thus the detailed descriptions of the same elements will be omitted in FIGS. 5A and 5B.

Referring to FIG. 5A, the display apparatus 302 includes a display panel 152, and a reflection layer 125, grid polarizing layers GP and a reflection preventing layer L3 are disposed on an opposite substrate 120.

In the illustrated exemplary embodiment, the reflection preventing layer L3 has a single-layer structure. In a case that the reflection preventing layer L3 has the single-layer structure, a portion of the external light ET is reflected by a first surface S1 of the reflection preventing layer L3 to generate a first reflected light RT1. The other portion of the external light ET passes through the reflection preventing layer L3 and is reflected by a second surface S2, which is a surface of the grid polarizing layers GP, to generate a second reflected light RT2. When the first and second reflected lights RT1 and RT2 are mixed with the light used to display an image on the display panel 152, a contrast ratio of the image is deteriorated. However, in the illustrated exemplary embodiment, when a thickness and a refractive index of the reflection preventing layer L3 are set to satisfy the following Equation 2, a destructive interference occurs between the first and second reflected lights RT1 and RT2, thereby effectively reducing the amount of the first and second reflected lights RT1 and RT2.

$$d \approx (\lambda/4) \times (1/n) \qquad \text{Equation 2}$$

In Equation 2, d denotes a thickness of the reflection preventing layer L3, λ denotes a wavelength of the external light ET, and n denotes a refractive index of the reflection preventing layer L3.

In the illustrated exemplary embodiment, the reflection preventing layer L3 includes one of metal oxide, metal nitride and transparent conductive oxide. In an exemplary embodiment, the reflection preventing layer L3 may include copper oxide CuOx, and in this case, the reflection preventing layer L3 may have a thickness of about 100 Å to about 500 Å, more particularly of about 280 Å to about 360 Å, for example.

Figure 6:
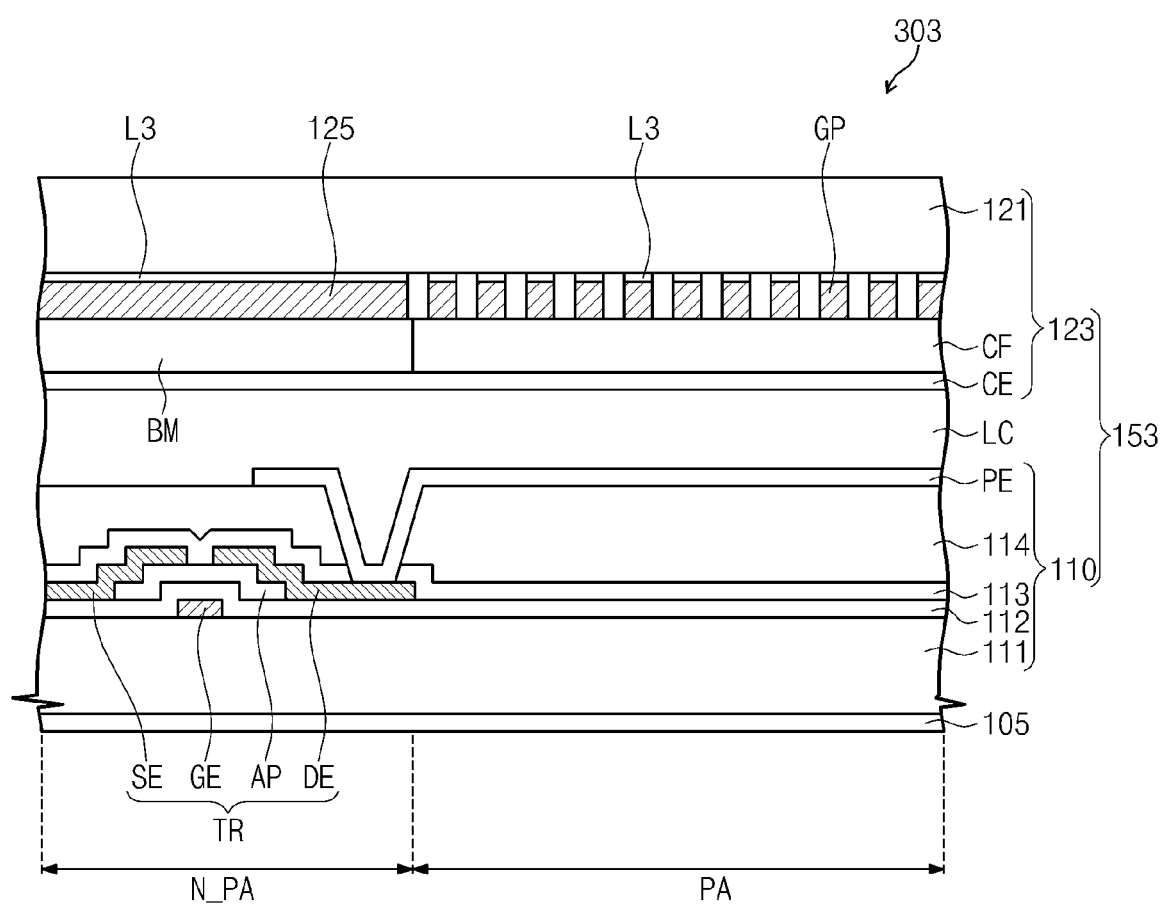
FIG. 6 is a cross-sectional view showing another exemplary embodiment of a display apparatus according to the invention.

FIG. 6 is a cross-sectional view showing a display apparatus 303 according to another exemplary embodiment of the invention. In FIG. 6, the same reference numerals denote the same elements in the above-described exemplary embodiments, and thus detailed descriptions of the same elements will be omitted.

Referring to FIG. 6, the display apparatus 303 includes a display panel 153, and the display panel 153 includes a display substrate 110 and an opposite substrate 123. In the illustrated exemplary embodiment, different from the exemplary embodiment shown in FIGS. 5A and 5B, grid polarizing layers GP, a reflection layer 125, and a reflection preventing layer L3 are disposed inside of the display panel 153. In more detail, the grid polarizing layers GP and the reflection layer 125 are disposed on a second substrate 121, and the reflection preventing layer L3 is disposed between the grid polarizing layers GP and the second substrate 121 and between the reflection layer 125 and the second substrate 121.

In the illustrated exemplary embodiment, the reflection preventing layer L3 has a single-layer structure. In this case, a thickness of the reflection preventing layer L3 is set to satisfy the above-mentioned Equation 2. In addition, the reflection preventing layer L3 includes one of metal oxide, metal nitride and transparent conductive oxide. In an exemplary embodiment, the reflection preventing layer L3 may include copper oxide (CuOx). Thus, when an external light is reflected by the grid polarizing layers GP and the reflection layer 125 after passing through the second substrate 121 to generate a reflected light, the amount of the reflected light is effectively reduced by the reflection preventing layer L3, for example.

Figure 7:
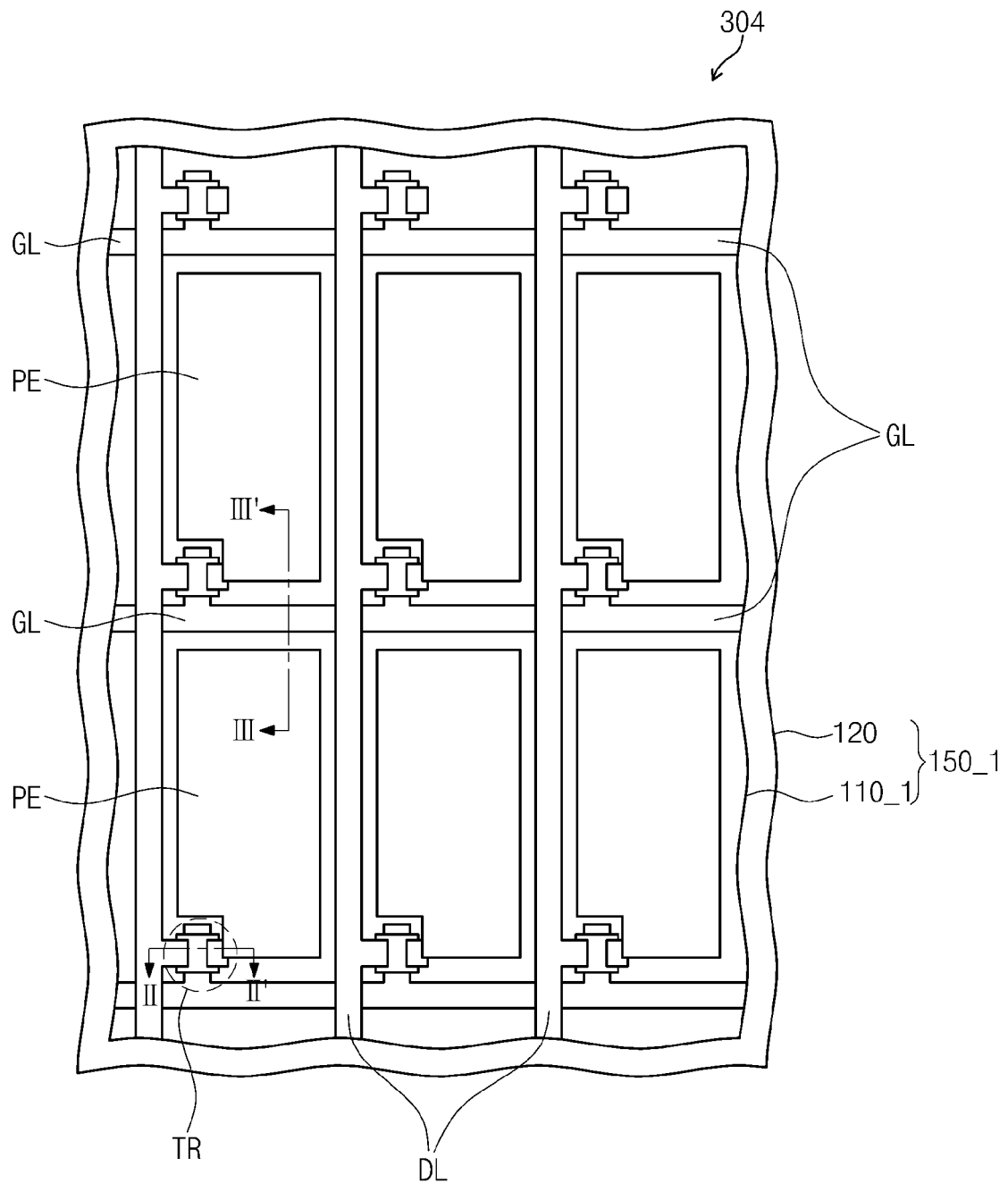
FIG. 7 is a plan view showing another exemplary embodiment of a display panel of a display apparatus according to the invention.
Figure 8A:
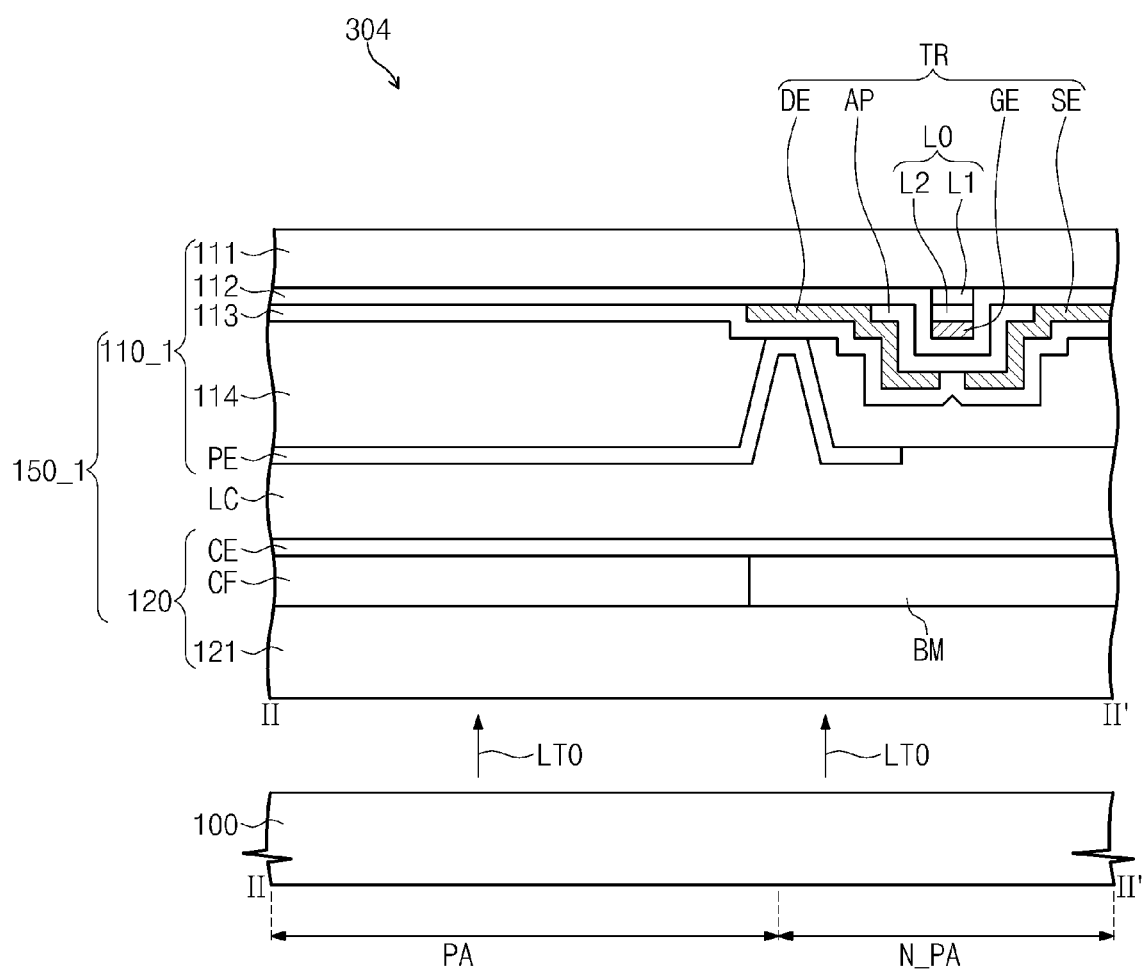
FIG. 8A is a cross-sectional view taken along line II-II' of FIG. 7.
Figure 8B:
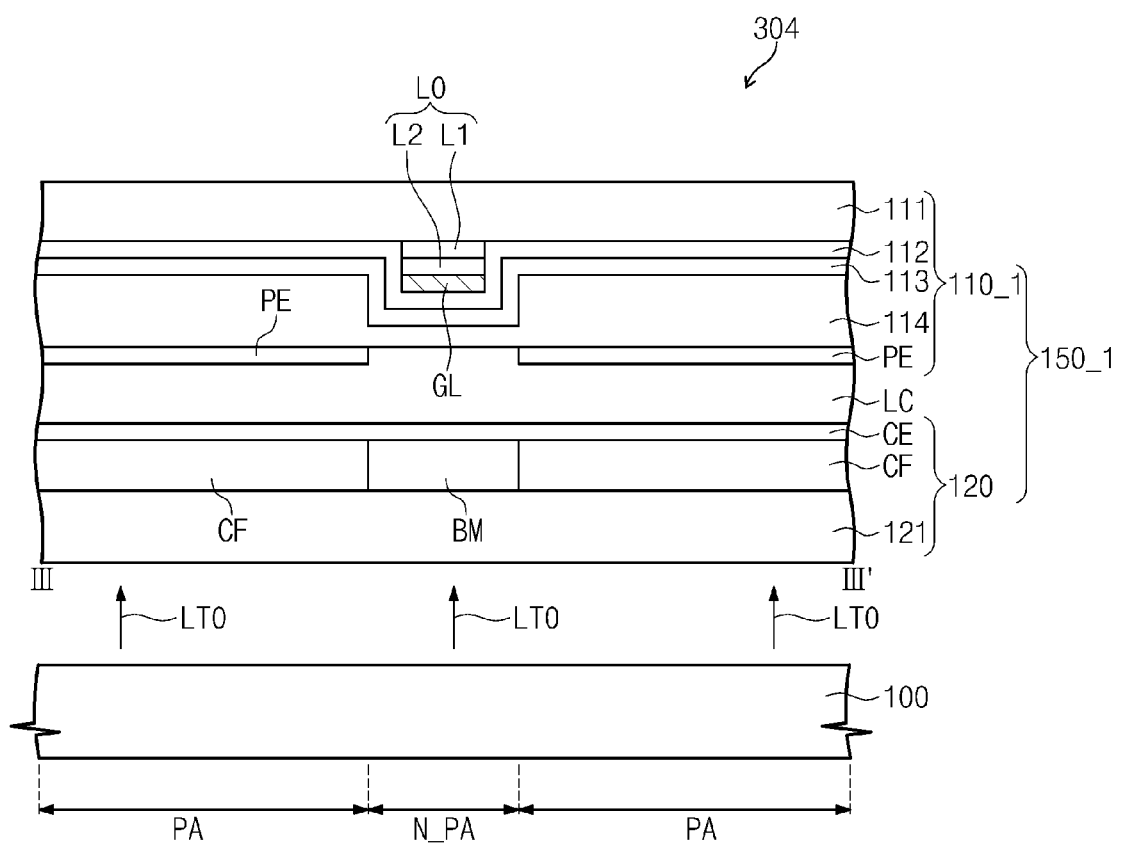
FIG. 8B is a cross-sectional view taken along line III-III' of FIG. 7.

FIG. 7 is a plan view showing a display panel of a display apparatus according to another exemplary embodiment of the invention, FIG. 8A is a cross-sectional view taken along line II-II' of FIG. 7, and FIG. 8B is a cross-sectional view taken along line of III-III' of FIG. 7. In FIGS. 7, 8A and 8B, the same reference numerals denote the same elements in the above-described exemplary embodiments, and thus detailed descriptions of the same elements will be omitted.

Referring to FIGS. 7, 8A and 8B, a display apparatus 304 includes a backlight assembly 100 and a display panel 150_1, and the display panel 150_1 includes a display substrate 110_1 and an opposite substrate 120. In the illustrated exemplary embodiment, the opposite substrate 120 may be disposed closer to the backlight assembly 100 than the display substrate 110_1. However, the invention is not limited thereto, and the opposite substrate 120 may be disposed closer to the display substrate 110_1 than the backlight assembly 100.

Gate lines GL, and data lines DL insulated from the gate lines GL while crossing the gate lines GL, are disposed on the display substrate 110_1. In an exemplary embodiment, a plurality of thin film transistors TR may be disposed in areas defined by the gate lines GL and the data lines DL in a one-to-one correspondence relationship. However, the invention is not limited thereto, and the plurality of thin film transistors TR may be disposed in areas which are not defined by the gate lines GL and the data lines DL.

In addition, a plurality of pixel electrodes PE is disposed in a plurality of pixel areas PA in a one-to-one correspondence and the pixel electrodes PE are electrically connected to the thin film transistors TR, respectively. The thin film transistors TR have the same structure and function as those of the thin film transistors TR shown in FIG. 3A, and the pixel electrodes PE have the same structure and function as those of the pixel electrodes PE shown in FIG. 3A.

In the illustrated exemplary embodiment, a reflection preventing layer L0 is disposed between each of the gate lines GL and a first substrate 111, and between the gate electrode GE and the first substrate 111. Similar to the reflection preventing layer L0 described with reference to FIGS. 3A and 3B, the reflection preventing layer L0 includes a first sub-layer L1 and a second sub-layer L2. In the illustrated exemplary embodiment, the first sub-layer L1 makes contact with the first substrate 111, the second sub-layer L2 makes contact with the first sub-layer L1, and the gate line GL and the gate electrode GE make contact with the second sub-layer L2.

A refractive index of the first sub-layer L1 is smaller than that of the second sub-layer L2. A thickness of each of the first and second sub-layers L1 and L2 may be set on the basis of the above-mentioned Equation 1, and each of the first and second sub-layers L1 and L2 may have the components and thicknesses as shown in the Table 1.

Hereinafter, a method of effectively reducing the amount of reflected light reflected by the gate lines using the reflection preventing layer L0 will be described with reference to FIG. 9. Since the method is the same as a method of effectively reducing the amount of reflected light reflected by the gate electrode GE using the reflection preventing layer L0, detailed descriptions on this will be omitted.

Figure 9:
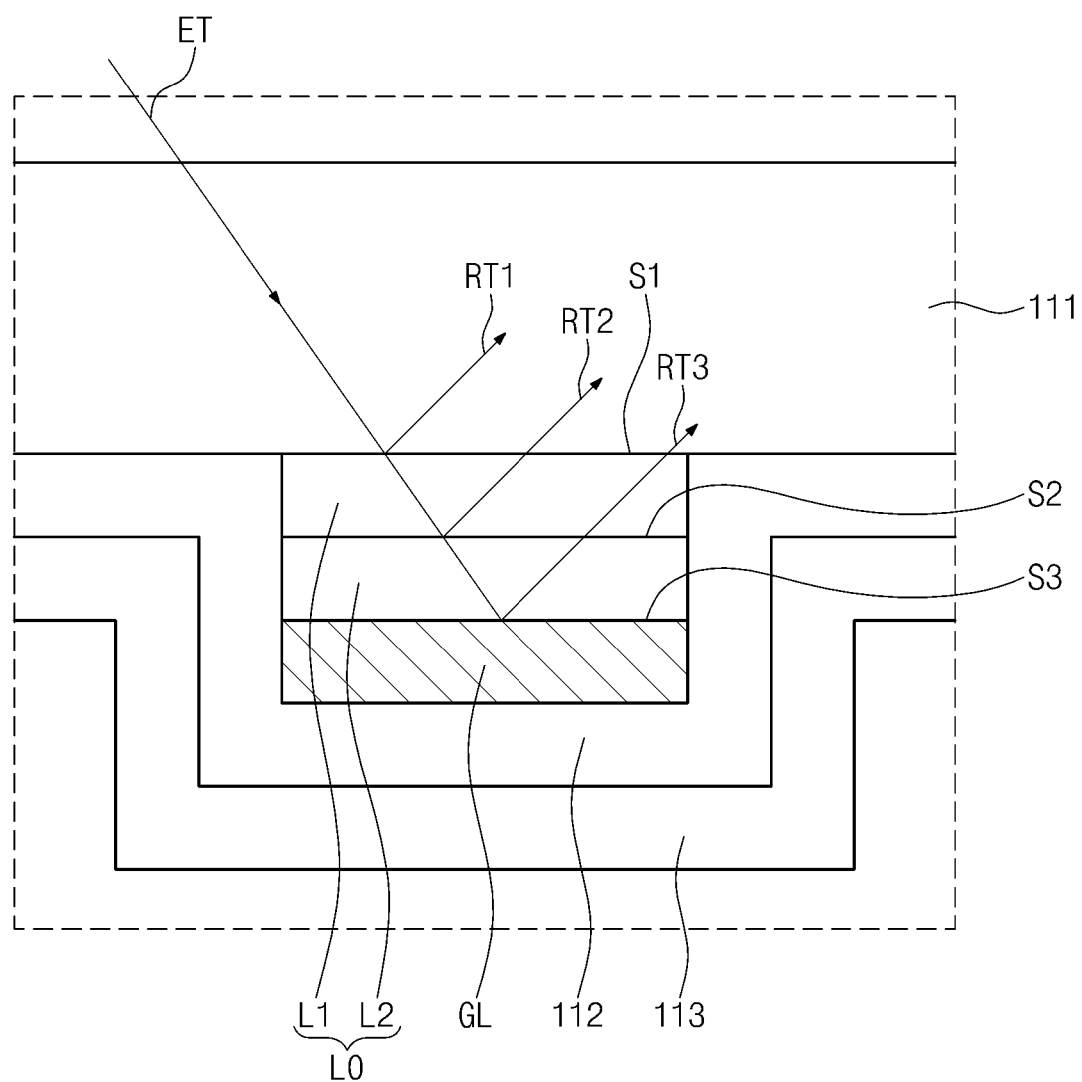
FIG. 9 is an enlarged cross-sectional view showing a first substrate, a reflection preventing layer and a gate line of FIG. 8B.

FIG. 9 is an enlarged plan view showing the first substrate 111, the reflection preventing layer L0 and the gate line GL of FIG. 8B.

Referring to FIG. 9, when an external light ET is provided to the display substrate 110_1 (refer to FIG. 8B), a portion of the external light ET passes through the first substrate 111. Then, the portion of the external light ET is reflected by a first surface S1 of the first sub-layer L1 to generate a first reflected light RT1. In addition, another portion of the external light ET passes through the first sub-layer L1 and is reflected by a second surface S2, which is an interface between the first sub-layer L1 and the second sub-layer L2, to generate a second reflected light RT2, and the other portion of the external light ET passes through the second sub-layer L2 and is reflected by a third surface S3, which is a surface of the gate line GL, to generate a third reflected light RT3.

The first, second and third reflected lights RT1, RT2 and RT3 may be mixed with the light used to display the image on the display panel 150-1 (refer to FIG. 8B) to cause a deterioration in a contrast ratio of the image. However, in the illustrated exemplary embodiment, when the thicknesses of the first sub-layer L1 and the second sub-layer L2 are set to satisfy the Equation 1, a destructive interference occurs between the third reflected light RT3 and at least one of the first and second reflected lights RT1 and RT2.

Thus, the amount of the light reflected by the gate line GL is effectively reduced by the reflection preventing layer L0, and a deterioration in the contrast ratio of the image displayed on the display panel 150_1 (refer to FIG. 8B) caused by the reflected light is effectively prevented.

In the illustrated exemplary embodiment, various exemplary embodiments of the components and thicknesses shown in the Table 1 may be used for the first and second sub-layers L1 and L2 to allow the reflection preventing layer L0 to have a reflectivity within a range from about 0.1% to about 5% by taking the wavelength of the external light ET, a thickness and a refractive index of the first sub-layer L1 and a thickness and a refractive index of the second sub-layer L2 into consideration.

In another exemplary embodiment, metal layers, which include the same material as that of the gate electrode GE and the gate line GL, may be further disposed between the first substrate 111 and the gate insulating layer 112. In an exemplary embodiment, an electrode of a storage capacitor used to charge the pixel electrode PE with electric charges or a storage line electrically connected to the storage electrode may be disposed between the first substrate 111 and the gate insulating layer 112, for example. In this case, the reflection preventing layer L0 may be further disposed between the first substrate 111 and the storage electrode and between the first substrate 111 and the storage line. Therefore, the reflection preventing layer L0 may effectively reduce the amount of the external light ET reflected by the electrode of the storage capacitor and the storage line.

Figure 10A:
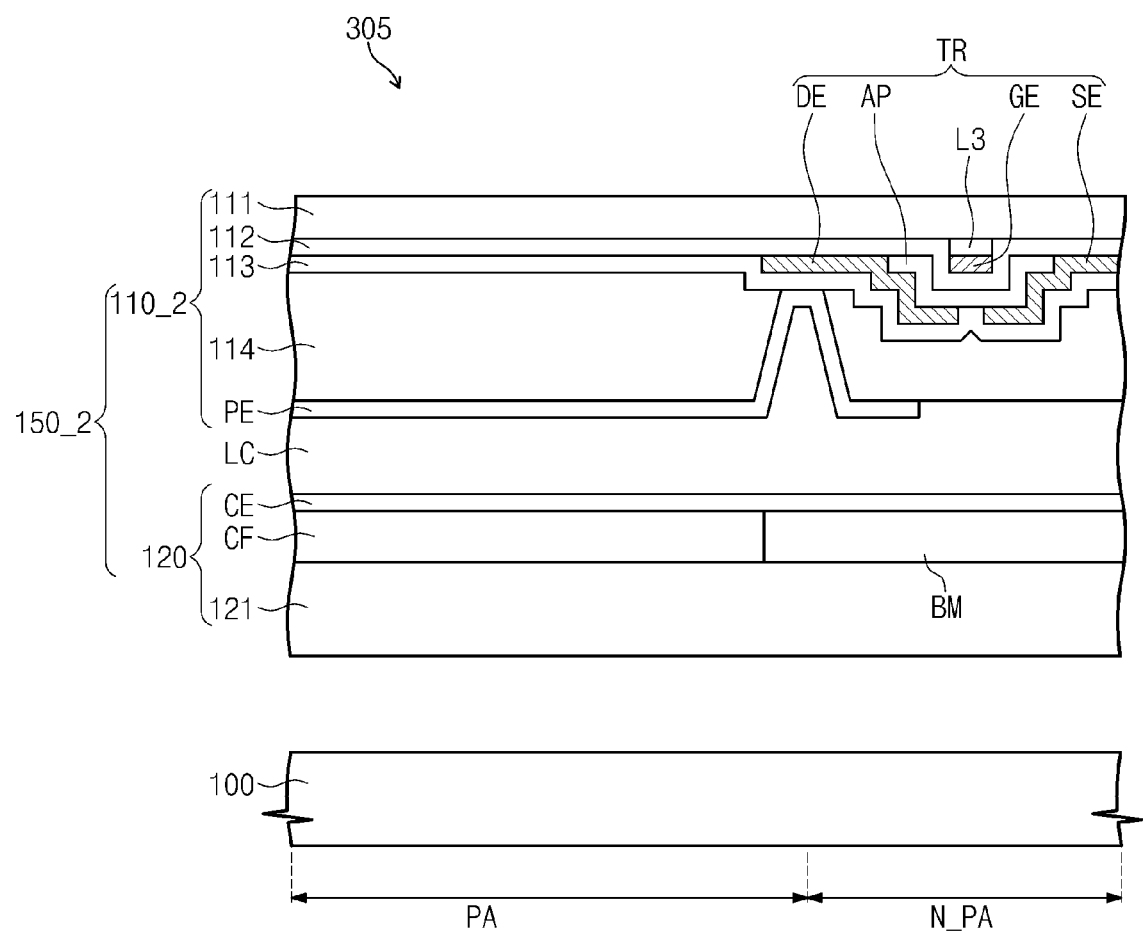
FIGS. 10A and 10B are cross-sectional views showing another exemplary embodiment of a display apparatus according to the invention.
Figure 10B:
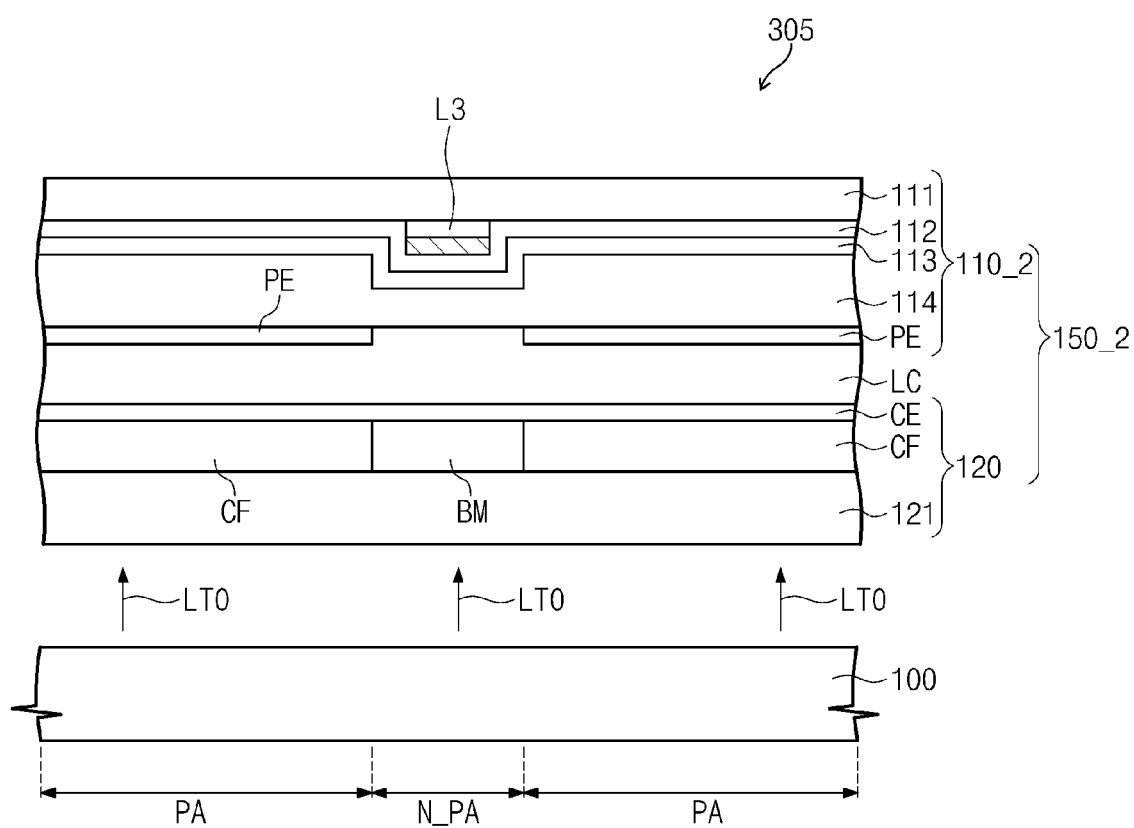
Figure 11:
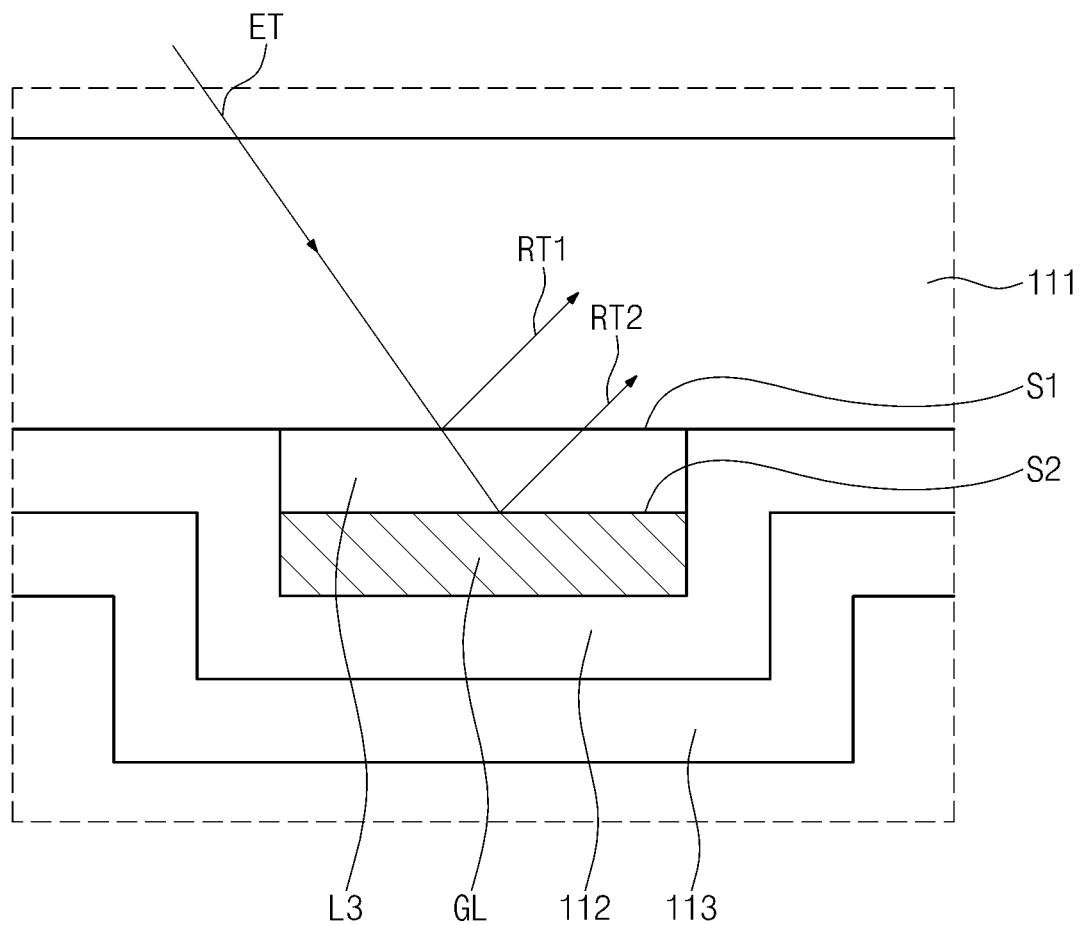
FIG. 11 is an enlarged cross-sectional view showing a reflection preventing layer and a gate line of FIG. 10B.

FIGS. 10A and 10B are cross-sectional views showing a display apparatus according to another exemplary embodiment of the invention, and FIG. 11 is an enlarged cross-sectional view showing a reflection preventing layer L3 and a gate line GL of FIG. 10B. In FIGS. 10A and 10B, a display apparatus 305 has the same structure and function as those of the display apparatus 304 shown in FIGS. 8A and 8B except for a reflection preventing layer L3. In FIGS. 10A and 10B, the same reference numerals denote the same elements in the above-described exemplary embodiment, and thus detailed descriptions of the same elements will be omitted.

Referring to FIGS. 10A, 10B and 11, the display apparatus 305 includes a display panel 150_2 and a backlight assembly 100, and the display panel 150_2 includes a display substrate 110_2 and an opposite substrate 120. In the illustrated exemplary embodiment, the reflection preventing layer L3 has a single-layer structure, and the reflection preventing layer L3 is disposed between a first substrate 111 and a gate line GL and between the first substrate 111 and a gate electrode GE.

Referring to FIG. 11, in a case that the reflection preventing layer L3 has the single-layer structure, a portion of an external light ET is reflected by a first surface S1 of the reflection preventing layer L3 to generate a first reflected light RT1. The other portion of the external light ET passes through the reflection preventing layer L3 and is reflected by a second surface S2, which is a surface of the gate line GL, to generate a second reflected light RT2.

When the first and second reflected lights RT1 and RT2 are mixed with the light used to display an image on the display panel 150_2, a contrast ratio of the image is deteriorated. However, in the illustrated exemplary embodiment, the amount of the first and second reflected lights RT1 and RT2 may be effectively reduced using a destructive interference occurring between the first and second reflected lights RT1 and RT2. When a thickness and a refractive index of the reflection preventing layer L3 are set to satisfy the Equation 2, the destructive interference occurs between the first and second reflected lights RT1 and RT2. In an exemplary embodiment, the reflection preventing layer L3 may have a thickness of about 100 Å to about 500 Å, more particularly of about 280 Å to about 360 Å, for example.

In addition, the reflection preventing layer L3 includes one of metal oxide, metal nitride, and transparent conductive oxide. In an exemplary embodiment, the reflection preventing layer L3 may include copper oxide (CuOx), for example. Thus, although the external light is reflected by the gate line GL after passing through the first substrate 111, the amount of the reflected light is effectively reduced by the reflection preventing layer L3.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
a backlight assembly which generates a light; and
a display panel which receives the light to display an image, the display panel comprising:
a first substrate;
a second substrate which faces the first substrate and is disposed closer to the backlight assembly than the first substrate;
a gate line disposed on the first substrate;
a data line disposed on the gate line and insulated from the gate line;
a thin film transistor disposed on the first substrate and electrically connected to the gate line and the data line; and
a reflection preventing layer which is disposed between the first substrate and the gate line, and the reflection preventing layer reducing an amount of a reflected light reflected by the gate line,
wherein the reflection preventing layer comprises a first sub-layer which is disposed on the first substrate and has a first refractive index, and a second sub-layer which is disposed between the first sub-layer and the gate line, and has a second refractive index which is greater than the first refractive index, and
wherein the reflected light is an external light reflected by the gate line, and a thickness of the first sub-layer and a thickness of the second sub-layer are obtained based on following equation, $$(d1+d2) \approx \{(\lambda/4) \times (1/n_1)\} + \{(\lambda/4) \times (1/n_2)\},$$

d1 denotes the thickness of the first sub-layer, d2 denotes the thickness of the second sub-layer, $\lambda$ denotes a wavelength of the external light, $n_1$ denotes the first refractive index of the first sub-layer, and $n_2$ denotes the second refractive index of the second sub-layer.

2. The display apparatus of claim 1, wherein the reflection preventing layer has a single-layer structure.

3. The display apparatus of claim 2, wherein the reflection preventing layer reduces the amount of the reflected light by using a destructive interference occurring between the reflected light and a light reflected by the reflection preventing layer.

4. The display apparatus of claim 3, wherein
the reflected light is an external light reflected by the gate line, and
a thickness of the reflection preventing layer is obtained based on following equation 1, $d \approx (\lambda/4) \times (1/n)$, wherein d denotes the thickness of the reflection preventing layer, $\lambda$ denotes a wavelength of the external light, and n denotes a refractive index of the reflection preventing layer.

5. The display apparatus of claim 2, wherein the reflection preventing layer comprises copper oxide.

6. The display apparatus of claim 5, wherein the reflection preventing layer has a thickness of about 100 angstroms to about 500 angstroms.

7. The display apparatus of claim 1, wherein
the gate line comprises at least one of copper, aluminum, molybdenum and titanium, and
the gate line has a thickness of about 0.3 micrometer to about 2.0 micrometers.

8. The display apparatus of claim 1, wherein the reflection preventing layer reduces the amount of the reflected light by using a destructive interference occurring between the reflected light and a light reflected by the first and second sub-layers.

9. The display apparatus of claim 1, wherein
the first sub-layer comprises at least one of metal oxide, metal nitride, transparent conductive oxide and metal, and
the second sub-layer comprises at least one of metal oxide, metal nitride and transparent conductive oxide.

10. The display apparatus of claim 9, wherein each of the first sub-layer and the second sub-layer has a thickness of about 50 angstroms to about 800 angstroms.

11. The display apparatus of claim 9, wherein the first sub-layer comprises molybdenum oxide and the second sub-layer comprises titanium nitride, or the first sub-layer comprises titanium oxide and the second sub-layer comprises titanium nitride, or the first sub-layer comprises aluminum oxide and the second sub-layer comprises copper oxide, or the first sub-layer comprises copper oxide and the second sub-layer comprises one of titanium nitride and molybdenum nitride, the first sub-layer comprises silicon oxide and the second sub-layer comprises copper oxide, or the first sub-layer comprises aluminum nitride and the second sub-layer comprises titanium nitride, or the first sub-layer comprises copper nitride and the second sub-layer comprises one of silicon oxide, aluminum oxide, gallium zinc oxide, aluminum zinc oxide, indium zinc oxide, silicon nitride, molybdenum oxide, aluminum nitride, and titanium oxide, or the first sub-layer comprises silicon nitride and the second sub-layer comprises copper oxide, or the first sub-layer comprises indium tin oxide and the second sub-layer comprises one of aluminum nitride and copper oxide, or the first sub-layer comprises indium zinc oxide and the second sub-layer comprises copper oxide, the first sub-layer comprises gallium zinc oxide and the second sub-layer comprises copper oxide, or the first sub-layer comprises aluminum zinc oxide and the second sub-layer comprises copper oxide, or the first sub-layer comprises titanium and the second sub-layer comprises gallium zinc oxide, indium zinc oxide, molybdenum oxide, and titanium oxide.

12. The display apparatus of claim 11, wherein a weight percent of indium oxide of the indium zinc oxide is in a range of about 10 wt % to about 90 wt %.

13. The display apparatus of claim 11, wherein a weight percent of aluminum oxide of the aluminum zinc oxide is in a range of about 0.1 wt % to about 10 wt %.

14. The display apparatus of claim 11, wherein a weight percent of gallium oxide of the gallium zinc oxide is in a range of about 0.1 wt % to about 30 wt %.

15. The display apparatus of claim 1, further comprising a pixel electrode electrically connected to the thin film transistor,
wherein the thin film transistor comprises:
a gate electrode disposed on the first substrate and electrically connected to the gate line;
an active pattern overlapped with the gate electrode;
a source electrode disposed on the active pattern and electrically connected to the data line; and
a drain electrode spaced apart from the source electrode, disposed on the active pattern, and electrically connected to the pixel electrode,
wherein the reflection preventing layer which is disposed between the gate electrode and the first substrate, and reduces the amount of the reflected light reflected by the gate electrode.

16. The display apparatus of claim 1, wherein the reflection preventing layer has a reflectivity of about 0.1% to about 5.0%.

* * * * *